(12) United States Patent
Hellberg et al.

(10) Patent No.: US 8,535,034 B2
(45) Date of Patent: Sep. 17, 2013

(54) INJECTION MOLD FOR OVERMOLDING COMPRESSIBLE CORDAGE

(76) Inventors: Karl Hellberg, Logan, UT (US); Cody Archibald, Logan, UT (US)

( * ) Notice: Subject to any disclaimer, the term of this patent is extended or adjusted under 35 U.S.C. 154(b) by 179 days.

(21) Appl. No.: 13/009,973

(22) Filed: Jan. 20, 2011

(65) Prior Publication Data

US 2012/0074613 A1 Mar. 29, 2012

Related U.S. Application Data

(62) Division of application No. 12/889,842, filed on Sep. 24, 2010, now Pat. No. 8,317,319.

(51) Int. Cl.
*B29C 45/14* (2006.01)
*B29C 45/32* (2006.01)
*B29C 45/36* (2006.01)

(52) U.S. Cl.
USPC ........... 425/111; 425/112; 425/121; 425/127; 425/129.1; 264/275; 264/274; 264/328.1; 264/328.8

(58) Field of Classification Search
None
See application file for complete search history.

(56) References Cited

U.S. PATENT DOCUMENTS

| | | | | |
|---|---|---|---|---|
| 4,238,107 A * | 12/1980 | Frankhouse | | 249/83 |
| 5,013,495 A * | 5/1991 | Noba et al. | | 264/1.25 |
| 6,071,446 A * | 6/2000 | O'Brien et al. | | 264/46.5 |
| 6,435,911 B1 * | 8/2002 | Payson et al. | | 439/606 |
| 6,514,064 B2 * | 2/2003 | Kondo | | 425/116 |
| 6,761,551 B2 * | 7/2004 | Kondo | | 425/116 |
| 6,957,485 B2 * | 10/2005 | Campbell | | 29/858 |
| 7,390,210 B2 * | 6/2008 | Corona | | 439/281 |
| 7,628,545 B2 * | 12/2009 | Cody et al. | | 385/69 |
| 2005/0208829 A1 * | 9/2005 | Campbell | | 439/587 |
| 2011/0057353 A1 * | 3/2011 | Allen, IV | | 264/279 |
| 2011/0177720 A1 * | 7/2011 | Cortes Roque et al. | | 439/660 |
| 2011/0245831 A1 * | 10/2011 | Giersch et al. | | 606/80 |

* cited by examiner

*Primary Examiner* — Edmund H. Lee
(74) *Attorney, Agent, or Firm* — J. Todd Rushton

(57) ABSTRACT

The present invention relates generally to intrinsic injection molding gates and a method of overmolding cordage. More specifically, this disclosure relates to a mold configuration wherein the viscous material is first injected into a distributor collar and then into a plurality of intrinsic injection molding gates with are formed between the injection mold and the cordage to be overmolded.

9 Claims, 7 Drawing Sheets

INJECTION MOLD FOR OVERMOLDING COMPRESSIBLE CORDAGE

This application is a divisional of application Ser. No. 12/889,842, filed Sep. 24, 2010, now U.S. Pat. No. 8,317,319. The complete disclosure of the aforementioned application is incorporated by reference.

BACKGROUND OF THE INVENTION

The present invention relates generally to intrinsic injection molding gates and a method of overmolding cordage. More specifically, this disclosure relates to a mold configuration wherein intrinsic injection molding gates are formed between the injection mold and the cordage to be overmolded.

Some commonly found examples of injection molding over cordage, include items such as dog retrieving dummies, boat docking buoys, dock lines and water ski ropes. When the overmolded portion is in the running length of the cordage, it is relatively easy to stabilize the cordage under tension and keep the overmolded portion properly located in the overmolded feature. However, for overmolding to be successful when the feature is on the end of the cordage, the overmolded portion must be thick enough to cover any included mechanical keys, knots or to simply cover the cordage if any side to side movement of the overmolded end occurs. Typically, the thickness of the overmold, measuring from the centerline of the overmold to the thinnest outside surface, must be equal to, or greater than, the length of cordage desired to be overmolded.

There are other common applications where overmolding may be desirable but is not presently used. Elastomeric and plastic parts are routinely adhesively attached to a section of cordage and some metal or plastic parts are mechanically connected. These methods are used to create, commonly known in the art, eyeglass retainers, bracelets, necklaces and identification lanyards. However, each of these methods requires multiple manufacturing and assembly steps. For example, in order to form an eyeglass retainer using a section of cordage with elastomeric connectors; cordage must be cut to length, injection mold a pair of elastomeric connectors, stage cordage, stage connectors, select cordage, manually apply adhesive to each end the cordage, select connectors, manually insert each end of the cordage into sockets in the elastomeric connectors, remove excess adhesive and place in drying area to allow for adhesive cure prior to packaging. Some of the issues and shortcomings related to this method of manual assembly include, accuracy of assembly, appearance of finished product, durability of the adhesive connection, messiness of the adhesive, exposure to the adhesive fumes, flammability of most adhesives, workplace ventilation requirements, staging of parts, rehandling of parts, time of production, task redundancy, worker fatigue and high labor costs. Issues with mechanically connected parts may include, accuracy of assembly, appearance of the finished product, durability of the assembly, staging of parts, rehandling of parts, time of production, machinery requirements, task redundancy, worker fatigue, risk of injury from machinery, risk of injury from repetitive task, and high labor costs.

It is generally accepted in industry that when a high volume of similar parts or products are required, mechanical assembly is preferable, and allows the manufacturer to provide a consistent, high quality product, at a reduced cost. However, when the product requires supple and relatively thin cordage and a plastic or elastomeric part having a thin profile, again, in items such as, eyeglass retainers, necklaces, bracelets or lanyards, the conventional methods of injection molding are not suited to provide an acceptable product. It has been found that when a supple thin section of cordage is inserted into a conventional mold body and elastomeric material is injected around the cordage, the initial surge of viscous material through the mold injection gate forces the cordage against the opposing wall of the mold body and the finished product will have either an undesirably thin overmolded section or the cordage will be exposed through overmolded material on the side opposite the injection gate.

Therefore, there is a need in the industry for an injection mold and method of use that allows a user to overmold elastomeric or plastic material over an end section of cordage and, more specifically, allow a user to overmold elastomeric or plastic material over an end section of supple thin cordage.

SUMMARY OF THE INVENTION

A first embodiment of the present invention is an injection mold used for overmolding cordage having, an opening in a first end, allowing an end portion of cordage to be inserted therein, and an injection gate proximate the first end. The injection gate discharges directly into a distributor collar or annular space formed by the walls of the mold and the inserted cordage. The distributor collar is followed by an intrinsic gate section that centers and restrains the end portion of the cordage and forces the injected material to flow substantially equally around the cordage. When using deformable cordage, the cross-sectional shape of the intrinsic gate section may be substantially circular, oval, eye shaped, square, rectangular, trapezoidal, or another custom shape. The intrinsic gate section is followed by a section of overmold that completely encases the end portion of cordage. The homogenous overmold is followed by the desired elastomeric feature which extends substantially beyond the encased end of the cordage.

A cut end of the cordage is placed into a retaining slot in the mold base with the desired portion for overmolding extended through a cordage slot or gate. The diameter of the cordage slot or gate is smaller than the diameter of the cordage, wherein the cordage is securely retained and sufficiently compressed to preclude injected elastomeric material from flashing back toward the running section of cordage. Once the cordage is in place the mold is closed and elastomeric material may be injected. When viscous material is injected into the distributor collar or the primary annular ring around the cordage, the material is constrained by the intrinsic gate section until the collar is filled to capacity and the increased mold pressure forces the material to flow evenly down channels formed between the gate section ribs and the outside surface of the retained cordage. The flow of material proceeds into the homogenous overmold section in a substantially even front, as the flow builds between the cordage and mold wall, the moving viscous material will straighten and center the cordage section to be overmolded. This ensures that the overmold section is of a substantially homogenous thickness, provides maximum structural integrity and provides an aesthetically pleasing product. The viscous material will proceed from the overmold section and fill the mold cavity for the desired elastomeric feature. It is noted that an even pressure for overmolding may also be achieved by providing multiple, four or more injection gates, which introduce viscous material simultaneously around the cordage. However, this method introduce problems of, injection sprue timing and having the mold separate on multiple planes to allow residual material clean out.

The overmolding process is effective over most commercially available cordage including, nylon, leather, cotton, stainless steel cable, monofilament or other suitable cordage. It is found that the pressure during overmolding allows a portion of the elastomeric material to penetrate into most cordage for a bond which is superior to adhesives. Additionally, overmolding eliminates multiple manual labor steps, eliminates the use of adhesive, improves safety, provides a more aesthetically pleasing product, and leads to direct cost savings during product assembly.

These and other features and advantages of the disclosure will be set forth and will become more fully apparent in the detailed description that follows and in the appended claims. The features and advantages may be realized and obtained by the instruments and combinations particularly pointed out in the appended claims. Furthermore, the features and advantages of the disclosure may be learned by the practice of the methods or will be obvious from the description, as set forth hereinafter.

BRIEF DESCRIPTION OF DRAWINGS

The following description of the embodiments can be understood in light of the Figures, which illustrate specific aspects of the embodiments and are part of the specification. Together with the following description, the Figures demonstrate and explain the principles of the embodiments. In the Figures the physical dimensions of the embodiment may be exaggerated for clarity. The same reference numerals in different drawings represent the same element, and thus their descriptions may be omitted.

DETAILED DESCRIPTION OF THE INVENTION

Figure 1:
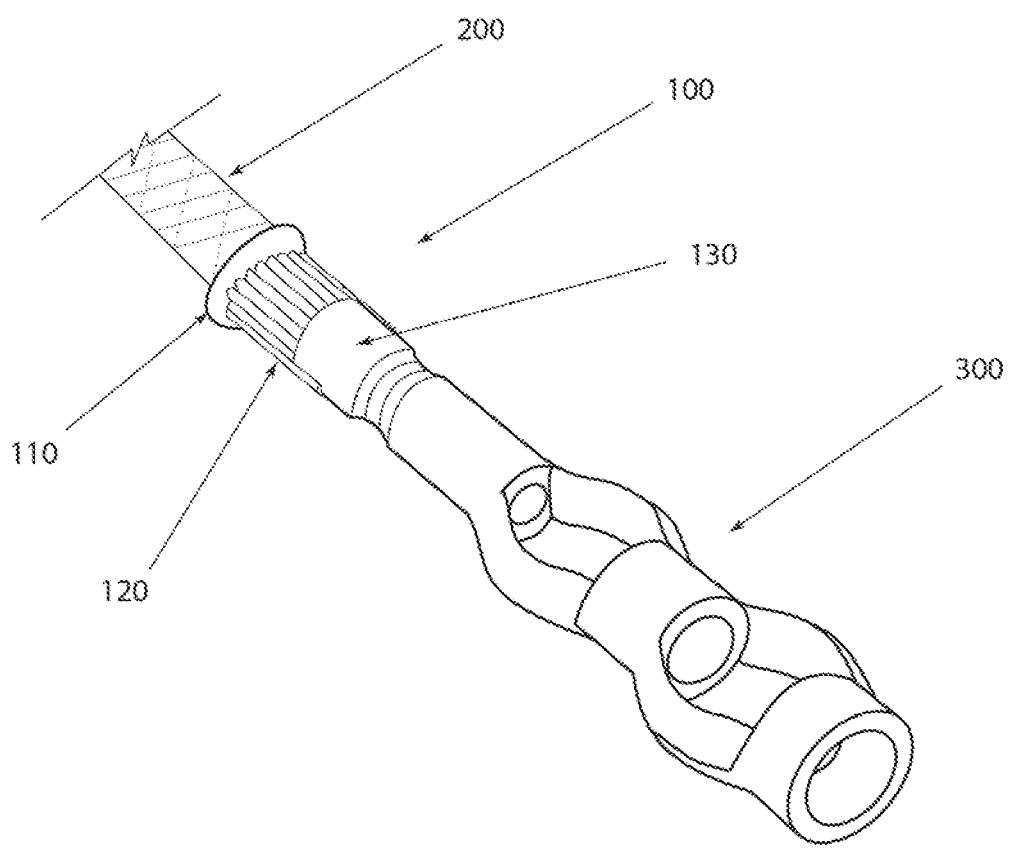
FIG. 1 illustrates an isometric view of an overmolded cordage end with the desired elastomeric feature being a co-axial multi-tip eyeglass retainer coupling in accordance with one embodiment of the disclosure.

For the purposes of promoting an understanding of the principles in accordance with the disclosure, reference will be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure.

As used in this specification and the appended claims, the singular forms "a," "an," and "the" include plural referents unless the context clearly dictates otherwise. In describing and claiming the present disclosure, the following terminology will be used in accordance with definitions set out below. As used herein, the terms "comprising," "including," "containing," "characterized by," and the grammatical equivalents thereof are inclusive or open-ended terms that do not exclude additional, unrecited elements or method processes.

The disclosure relates to intrinsic injection molding gates and a method of overmolding cordage. More specifically, this disclosure relates to a mold configuration wherein intrinsic injection molding gates are formed between the injection mold and the cordage to be overmolded.

Overmolding is the process of forming and securely attaching an injection molded feature onto a previously fabricated product or part.

Cordage as it relates to the present disclosure is an extended substantially cylindrical form, such as rope, wire, cable, braid, weave, monofilament and may be comprised of nylon, polyester, cotton, leather, metal wire, cable, monofilament, or composite.

Intrinsic gate as it relates to the present disclosure means the complete gate is not solely an engineered feature of the mold, but is formed as composite of the mold features and the part to be overmolded.

Illustrated in FIG. 1, is an isometric view of an elastomeric overmold 100, on cordage 200. The cordage 200 may be one of nylon, polyester, cotton, leather, wire, cable, monofilament, or another suitable material or any combination or a composite of two or more materials. The cordage 200 may be selected by the determining factors of the desired end product, these factors may include, strength, flexibility, comfort, hygiene, water or chemical resistance, fashion, color, etc. The overmold 100 may be composed of elastomeric material, such as rubber, neoprene or may be a rigid or semi-rigid plastic, nylon or compatible material. However, for clarity and simplicity of this application most references to the overmold 100 will be referred to as an elastomeric material. Overmold 100 includes a distributor collar 110, which is formed as an annular ring between the mold body (not shown), and the outside diameter of the cordage. The distributor collar 110 is followed by an intrinsic gate section 120, a homogenous overmold section and the desired elastomeric element 300.

Figure 2:
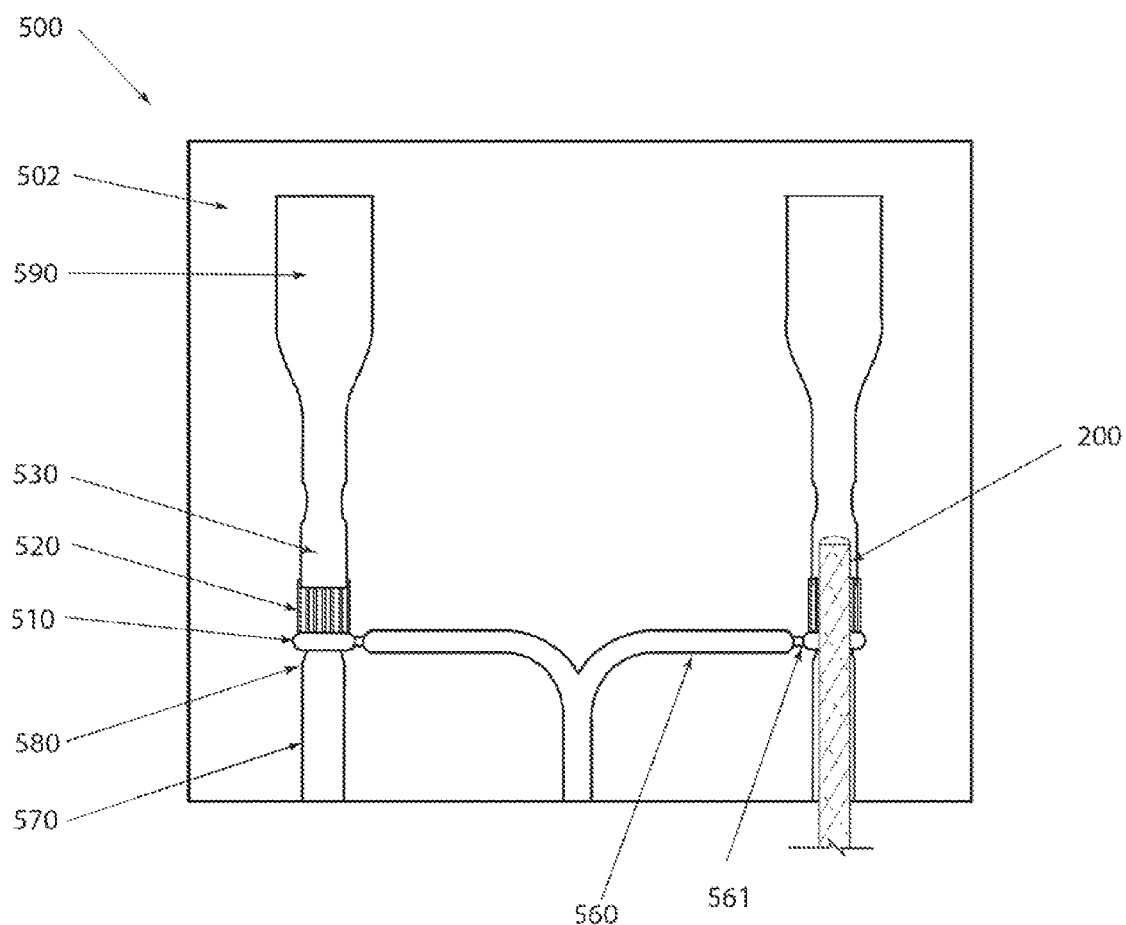
FIG. 2 illustrates a plan view of an open injection mold showing one embodiment of the present invention.

FIG. 2, shows a plan view of the bottom half 502, of the mold base 500, the mold base includes, a cordage retention slot 570, cordage gate 580, the distributor collar form 510, the intrinsic gate form 520, the homogenous overmold form 530, and the desired elastomeric element or feature form 590. Material is injected into the mold base 500, using injection sprue 560 and through gate 561.

When a section of cordage 200 is inserted into the bottom half 502, of mold base 500. The cordage 200 is aligned and stabilized by a cordage retention slot 570, the cordage end 200, extends toward the forward portion of the homogenous overmold form section 530. The cordage gate 580 compresses the cordage 200, and precludes elastomeric material from escaping back into the cordage slot 570, and flashing over the running portion of cordage 200. The outside diameter of cordage 200 in distributor collar form 510, creates an annular ring which is completely filled with elastomeric material. Mold pressure builds before the material breaks through the intrinsic gate section form 520 and is evenly distributed through the homogenous overmold section form 530 and into the desired element or feature form 590.

Figure 3A:
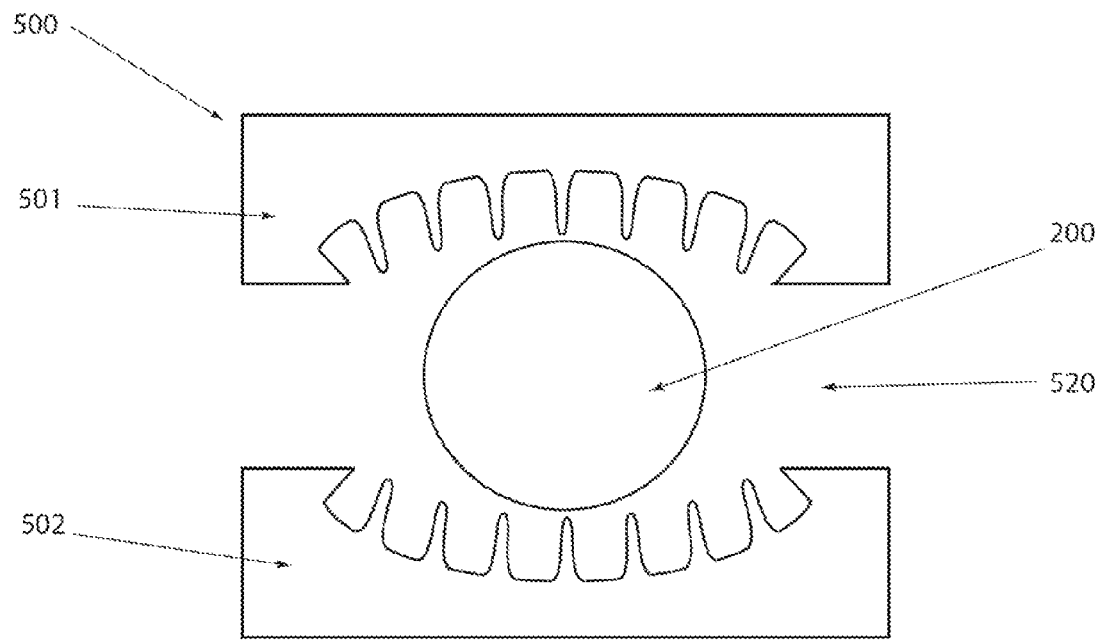
FIG. 3A illustrates an open injection mold section showing one embodiment of the intrinsic gate section.
Figure 3B:
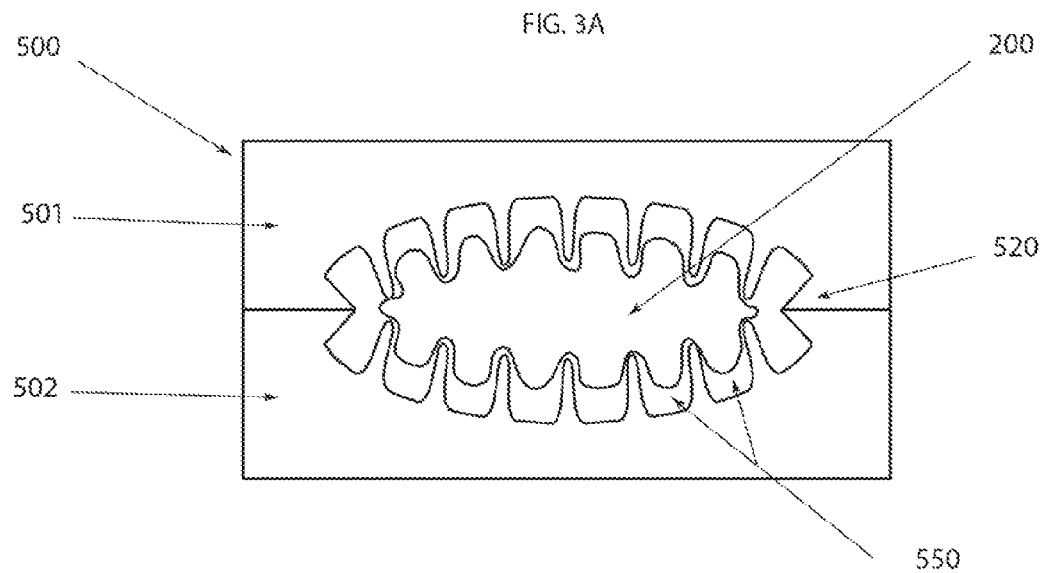
FIG. 3B illustrates a closed injection mold section showing one embodiment of the intrinsic gate section.

An open mold 500 is shown in FIG. 3A, cordage 200 is inserted into intrinsic gate section 520 (plan view, FIG. 2) and top and bottom mold halves, 501 and 502. As shown in FIG. 3B, the mold halves, 501 and 502, are closed over cordage 200, compressing the cordage and creating intrinsic gates 550. Intrinsic gates 550 are defined by the boundary created by the gate section ribs 551, the inside diameter of the intrinsic gate section form 520, and the outside surface of cordage 200. As previously described, when viscous elastomeric material is injected into the distributor collar form 510, the material will completely fill distributor collar form 510, prior to pressure building and the material is allowed to break over and evenly press through intrinsic gates 550. The distribution of material on the outlet side of intrinsic gates 550, cause the elastomeric material to flow evenly over the outside surface of cordage 200, centering the cordage 200 in the homogenous overmold section form 530 (FIG. 2), and providing a elastomeric layer having a consistent thickness, which is securely attached and visually appealing. The area of intrinsic gates 550 is determined by the diameter of the cordage, thickness of the overmolded section, the volume of the finished elastomeric element, type of material, molding temperature, viscosity of the material and other independent factors as well as permutations of those factors. The shape of the intrinsic gate form 520, can be substantially circular, oval, eye shaped, square, rectangular, trapezoidal, or another custom shape, so long as it functions to center and restrain the cordage and provide sufficient relief for material to flow through intrinsic gates 550.

Figure 4:
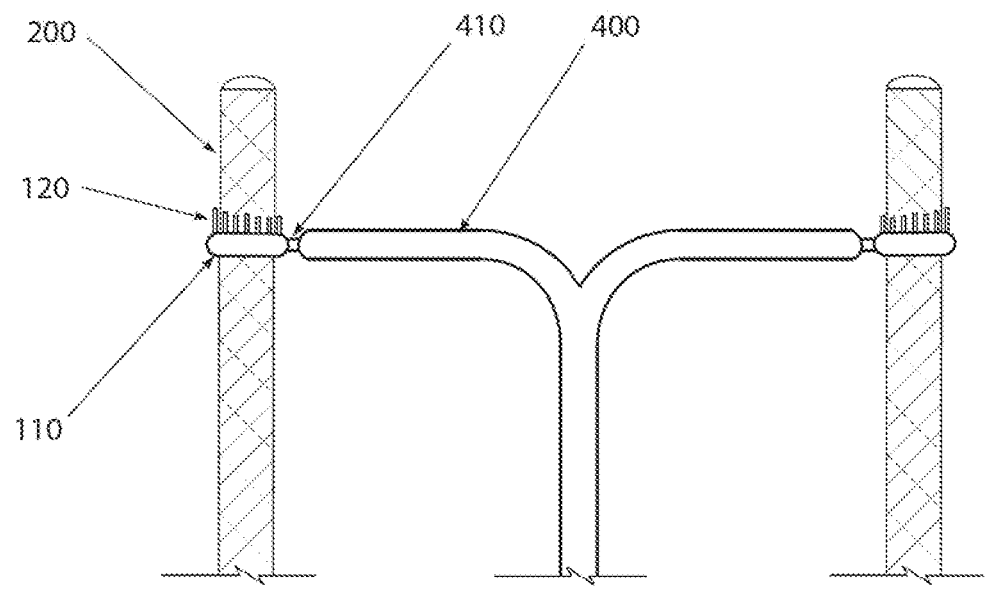
FIG. 4 illustrates the progression of the molding process in accordance with one embodiment of the disclosure.
Figure 5:
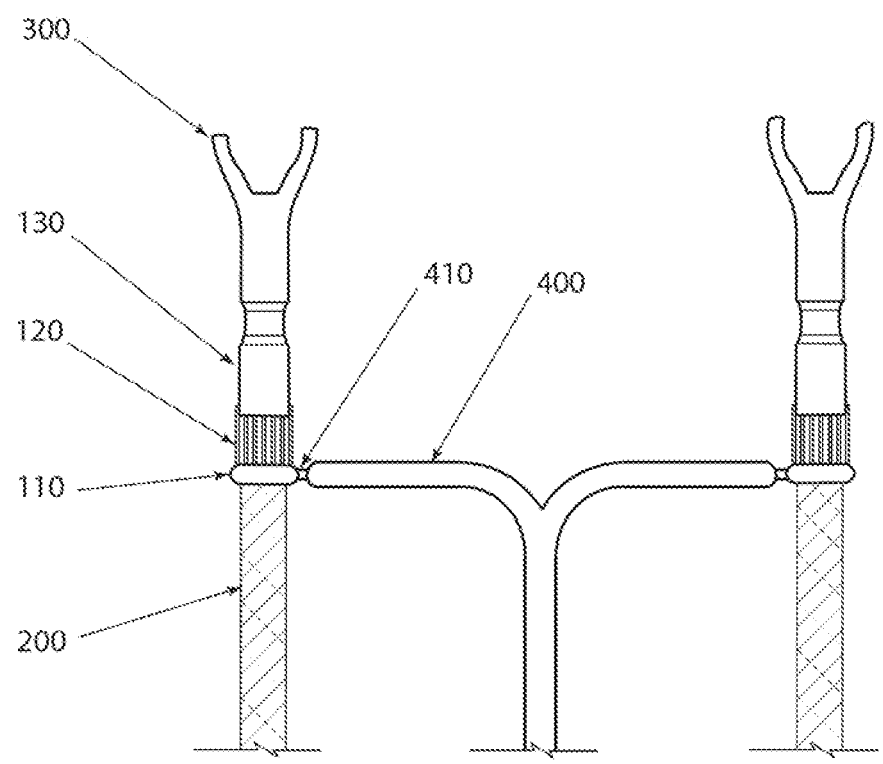
FIG. 5 illustrates the progression of the molding process in accordance with one embodiment of the disclosure.
Figure 6:
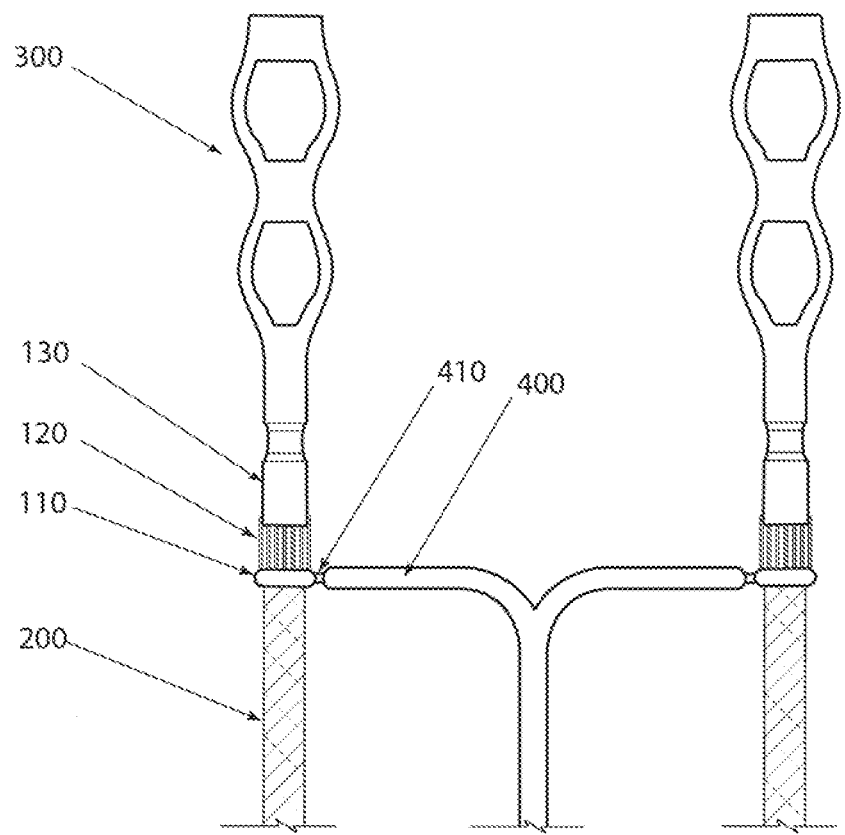
FIG. 6 illustrates the progression of the molding process in accordance with one embodiment of the disclosure.
Figure 7A:
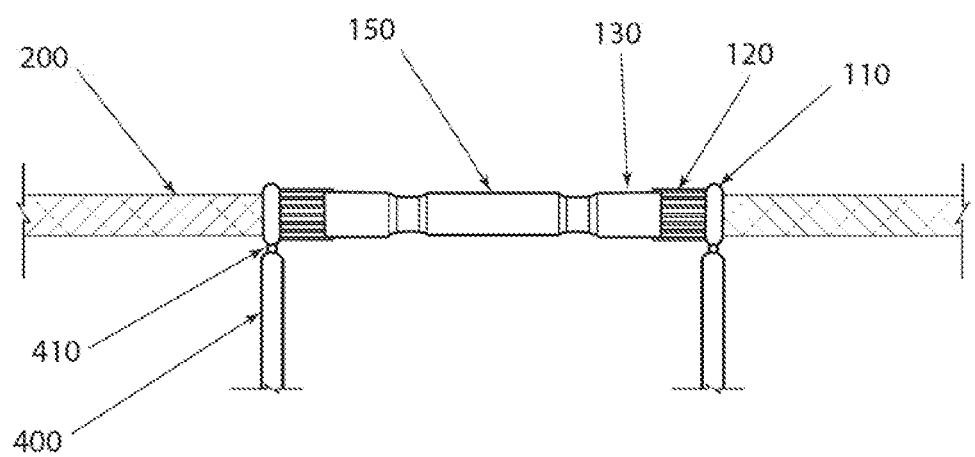
FIG. 7A illustrates overmolding multiple cordage ends to form a linear junction in accordance with one embodiment of the disclosure.
Figure 7B:
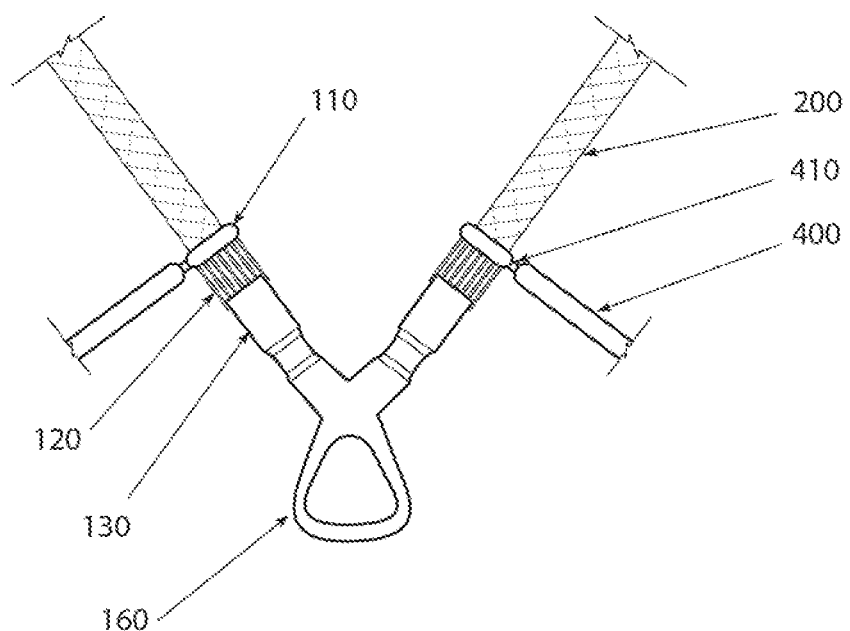
FIG. 7B illustrates overmolding multiple cordage ends to form an offset junction in accordance with one embodiment of the disclosure.

FIGS. 4, 5 and 6 shows the consistent progression of the overmold material on cordage 200, note, figures are a direct representation of actual product samples. FIG. 4 shows the overmold material forming the sprue or runner 400, proceeding through gate 410 into distribution collar 110, and stopping partially through intrinsic gate section 120. FIG. 5 includes the homogenous overmold section 130 and a portion of the desired elastomeric element 300. FIG. 6 shows the overmold having a completed elastomeric element 300.

FIG. 6A is one embodiment of the present invention where overmolding is used to connect two sections of cordage 200 in a lineal arrangement or where overmolding is used to connect two ends of the same section of cordage 200 into a loop. The loop configuration can be used to form items such as a bracelet or necklace having the advantage of an elastic section 150. The elastic section 150 allows a user to stretch a typically rigid bracelet made from nylon climbing rope over their hand or it can be used as a break-away for a necklace.

FIG. 6B is one embodiment of the present invention where overmolding is used to connect two ends of the same section of cordage 200 in an offset junction. This configuration may be used to form a typical identification lanyard, having an attachment loop 160.

In view of the foregoing, those having ordinary skill in the relevant art will appreciate the advantages provided by the features of the present disclosure.

It is to be understood that the above mentioned arrangements are only illustrative of the application of the principles of the present disclosure. Numerous modifications or alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

The invention claimed is:

1. An injection mold for overmolding compressible cordage comprising;
   an injection mold base;
      a cordage retaining slot having a first diameter equal to the diameter of a cord to be overmolded,
      a cordage gate having a second diameter less than the diameter of the cord to be overmolded,
      a distributor collar cavity,
      an intrinsic injection gate section having,
         a plurality of ribs arranged in a radial pattern, axially aligned with the intrinsic gate section,
         the plurality of ribs,
            compressing the cord to be overmolded to a diameter less than the original diameter,
            restraining the cord to be overmolded axially, and,
            forming a plurality of intrinsic injection gates, the intrinsic injection gates restricting injected material to break-over simultaneously, and,
   a overmolding cavity.

2. The injection mold of claim 1, wherein the cordage gate compresses a cord prior to overmolding.

3. The injection mold of claim 1, wherein the distributor collar cavity forms an annular ring about the outside surface of a cord prior to overmolding.

4. The injection mold of claim 1, wherein the shape of the intrinsic injection gate section is one of, circular, oval, eye, square, rectangular, triangular, trapezoidal, pentagon, hexagon, octagon and irregular.

5. The injection mold of claim 1, wherein the area of each of the plurality the intrinsic injection gates is defined by a inside wall of the mold base, a side wall of one of the plurality of ribs, an opposing side wall of one of the plurality of ribs and the outside surface of the cord.

6. A overmold on compressible cordage comprising;
   a compressible cord having and outside surface and a terminating end,
   a cordage gate section wherein the cord is compressed to a diameter less than the original diameter,
   a distributor collar,
   an intrinsic injection gate section having a plurality of ribs arranged in a radial pattern, axially aligned with the cord, and,
   a overmolded section.

7. The overmold of claim 6, wherein the distributor collar forms an annular ring around the outside surface of the cord.

8. The overmold of claim 6, wherein the thickness of the overmold section is homogenous.

9. The overmold of claim 6, wherein the thickness of the overmold section is irregular.

* * * * *